US011602010B2

(12) United States Patent
Akman et al.

(10) Patent No.: US 11,602,010 B2
(45) Date of Patent: *Mar. 7, 2023

(54) OPEN CONTROL PLANE FOR MOBILE NETWORKS

(71) Applicant: Netsia, Inc., Santa Clara, CA (US)

(72) Inventors: Arda Akman, Istanbul (TR); Burcu Yargicoglu, Istanbul (TR)

(73) Assignee: Netsia, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,964

(22) Filed: Jul. 19, 2021

(65) Prior Publication Data

US 2021/0352763 A1 Nov. 11, 2021

Related U.S. Application Data

(63) Continuation of application No. 16/592,754, filed on Oct. 3, 2019, now Pat. No. 11,071,166.

(51) Int. Cl.
*G06F 13/00* (2006.01)
*H04W 80/10* (2009.01)
*H04W 92/04* (2009.01)

(52) U.S. Cl.
CPC ............ *H04W 80/10* (2013.01); *H04W 92/04* (2013.01)

(58) Field of Classification Search
CPC ..... H04W 80/10; H04W 92/04; H04W 24/10; H04W 24/02; H04W 60/00; H04W 76/12;
(Continued)

(56) References Cited

U.S. PATENT DOCUMENTS 6,907,521 B2 * 6/2005 Saw-Chu .............. G06F 9/4812
345/519
7,266,544 B1 9/2007 Dodge et al.
(Continued)

OTHER PUBLICATIONS

Notice of Allowance from U.S. Appl. No. 16/663,323, dated Jun. 4, 2020, 9 pp.
(Continued)

*Primary Examiner* — Kenneth R Coulter
(74) *Attorney, Agent, or Firm* — Shumaker & Sieffert, P.A.

(57) ABSTRACT

An 'open control network' is described, wherein the control plane functions within the Radio Access Network (such as eNodeB and gNodeB) and Core Network (such as MME, AMF and SMF) provide an interface towards the operator and $3^{rd}$ party control applications. Applications are allowed to securely register to signaling protocols within the control plane, specifically to the RAN or the Core Network control functions to view, intercept and intervene certain types of control messages or procedures. Innovative applications can be developed to view and modify control plane behavior utilizing both traditional methods as well as upcoming Machine Learning and Artificial Intelligence algorithms to provide services that are not part of standard operator offerings. An even more flexible control plane infrastructure is described by allowing operator services and/or non-operator services to subscribe to certain control functions/ messages to manage in real-time certain user-group's behavior or enforce slice-specific behavior according to slice requirements.

20 Claims, 10 Drawing Sheets

(58) Field of Classification Search
CPC . H04L 65/1016; H04L 65/1069; H04L 65/80; H04L 65/1073
USPC ......... 709/250, 249, 223, 213–216, 204–206
See application file for complete search history.

(56) References Cited

U.S. PATENT DOCUMENTS

| | | | |
|---|---|---|---|
| 7,603,444 | B2 | 10/2009 | Bullis |
| 10,554,328 | B2 | 2/2020 | Xu et al. |
| 10,797,934 | B1 | 10/2020 | Akman et al. |
| 10,863,556 | B2* | 12/2020 | Lau ................... H04W 48/10 |
| 11,071,166 | B2* | 7/2021 | Akman ............... H04W 24/02 |
| 11,330,646 | B2* | 5/2022 | Lau ................... H04W 76/11 |
| 2003/0065914 | A1 | 4/2003 | Saw-Chu et al. |
| 2005/0114083 | A1 | 5/2005 | Bullis |
| 2018/0145790 | A1 | 5/2018 | Xu et al. |
| 2019/0191467 | A1 | 6/2019 | Dao et al. |
| 2020/0120721 | A1* | 4/2020 | Lau ................... H04W 76/11 |
| 2021/0058984 | A1* | 2/2021 | Lau ................... H04W 76/11 |

OTHER PUBLICATIONS

Stewart, "Stream Control Transmission Protocol," Network Working Group; RFC 4960, Sep. 2007, 152 pp.
Universal Mobile Telecommunications System (UMTS); LTE; Non-Access-Stratum (NAS) protocol for Evolved Packet System (EPS); Stage 3, 3GPP TS 24.301, V8.10.0, Release 8, Jun. 2011, 264 pp.
3rd Generation Partnership Project; Technical Specification Group Radio Access Network; NR; Radio Resource Control (RRC) protocol specification (Release 15), 3GPP TS 38.331, V15.4.0, Dec. 2018, 474 pgs.
Prosecution History for U.S. Appl. No. 16/592,754, dated Jun. 12, 2020 to Mar. 19, 2021, 65 pp.

* cited by examiner

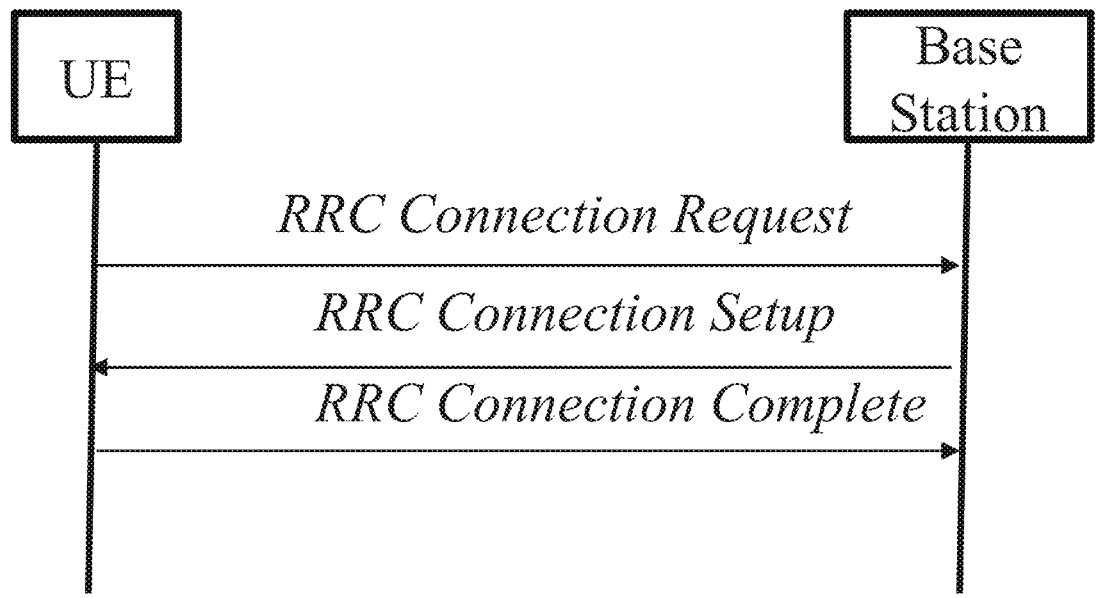
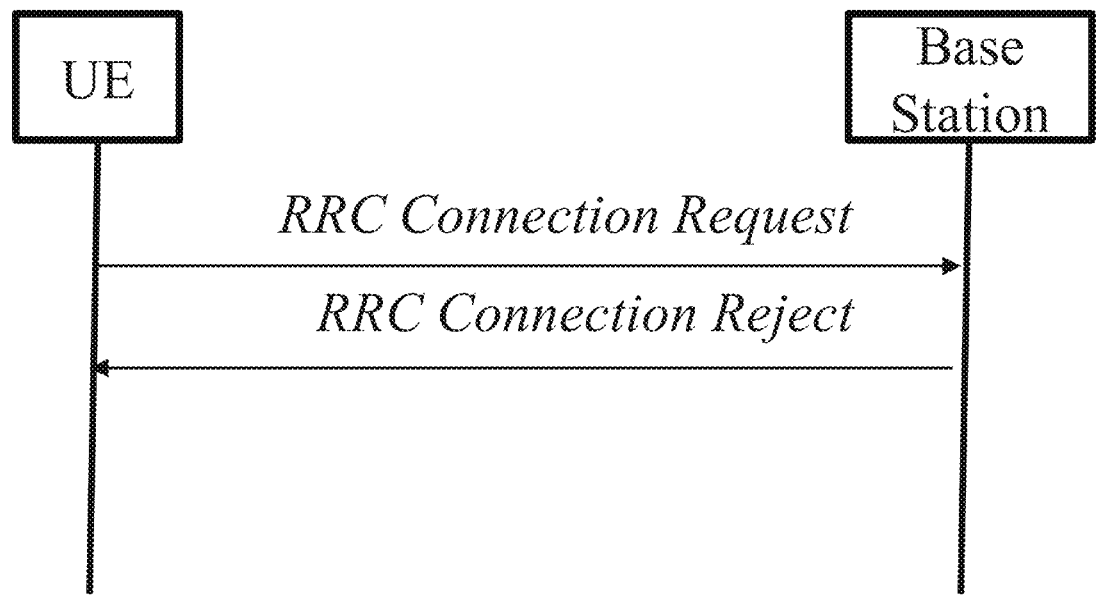
FIG. 7

OPEN CONTROL PLANE FOR MOBILE NETWORKS

CROSS REFERENCE

This application is a continuation of U.S. patent application Ser. No. 16/592,754, filed 3 Oct. 2019, now U.S. Pat. No. 11,071,166, the entire contents of which is incorporated herein by reference.

BACKGROUND OF THE INVENTION

Field of Invention

The present invention relates to a system and method for providing an open control plane network of a cellular operator that provides interfaces from control plane services to operator and third-party applications so that they can copy, intercept and intervene signaling/control messages.

Discussion of Related Art

Any discussion of the prior art throughout the specification should in no way be considered as an admission that such prior art is widely known or forms part of common general knowledge in the field.

The 3G standards tightly couples control and data plane functions in Serving GPRS Support Node (SGSN) and Gateway GPRS Support Node (GGSN). In contrast, the mobility management functionality of the SGSN is separated out into the Mobility Management Entity (MME) that formed the control plane in 4G, while the data plane functionality of the SGSN is separated into yet another component called the Serving Gateway (SGW). This separation allows scaling of the control plane aspects in the MME independently of the data forwarding aspects in the SGW and Packet Gateway (PGW). The collection of SGW, PGW and MME form the so-called Enhanced Core Network (EPC). Furthermore, the SGW and PGW are divided into control plane and user plane (synonymous with data plane) functions, e.g., SGW-C and SGW-U, allowing the centralization of the control of the SGW and PGW, where a single SGW-C or PGW-C can now control many SGW-Us or PGW-Us, respectively. The S1-C (control plane) interface in 4G is used between eNodeB and EPC: specifically, between the MME and S-GW. The S1 (control plane) interface consists of a Stream Control Transmission Protocol (SCTP) over IP (see RFC 4960: "Stream Control Transmission Protocol") and supports multiple UEs through a single SCTP association. It also provides guaranteed data delivery. The S1 control plane interface is responsible for bearer setup/release procedures, the handover signalling, the paging and the Non-Access Stratum (NAS) transport procedures.

The 5G standards went further in control and user plane separation by providing an even more granular division of control plane functions. The Access and Mobility Management Function (AMF), for example, provides services analogous to mobility management functions of the MME. However, the session management functions of the MME are separated out and combined with SGW-C and PGW-C functions to create the so called Session Management Function (SMF). Thus, the AMF, unlike the MME, does not include session management. For example, the session management control messages from the UE are terminated by the SMF, whereas in 4G, these would have been terminated by the MME. One advantage of the mobility management and session management separation is that AMF can now be adapted for non-3GPP access networks as well. In 5G, the protocol for interaction between all control-plane entities is HTTP, which is a protocol widely used in the Internet. A service-based architecture is employed at the control plane, where components can query the Network Repository Function (NRF) to discover and communicate with each other over simple APIs.

A User Equipment (UE) has two main types of control plane connections with the mobile network: (1) a Radio Resource Control (RRC) connection to the base station (see reference 3GPP TS 38.331, V15.4.0, Radio Resource Control Protocol), and (2) a Non-access Stratum (NAS) (see reference 3GPP TS 24.301, Rel. 8, NAS for Evolved Packet System (EPS)) connection. The NAS connection is between the UE and MME in 4G, and between the UE and AMF in 5G. The NAS protocol is used for network attachment, authentication, setting up bearers, and mobility management. The RRC makes handover decisions based on neighbor cell measurements reported by the UE, performs paging of users over the air-interface, broadcasts system information, controls UE measurement and reporting functions such as the periodicity of channel quality indicator reports, and further allocates cell-level temporary identifiers to active users. It also executes transfer of UE context from the serving base station to the target base station during handover, and performs integrity protection of RRC messages. The RRC layer is responsible for setting up and maintenance of radio bearers. Note that the RRC sub-layer in 3GPP protocol hierarchy is considered as layer 3.

One of the primary technical challenges facing service providers today is the ability to deliver a wide array of network performance characteristics that future services will demand. To name a few, bandwidth, latency, packet loss, security, and reliability will greatly vary from one service to the other. Emerging applications such as remote operation of robots, massive IOT, and self-driving cars require connectivity, but with vastly different characteristics. The combination of architecture flexibility, software programmability, and needs of different business segments (medical, factories, military, public safety, etc.) and applications have led to the creation of the concept of network slicing. A network slice provides a way to completely segment the mobile network to support a particular type of service or business or even to host service providers (multi-tenancy) who do not own a physical network. Furthermore, each slice can be optimized according to capacity, coverage, connectivity, security and performance characteristics. Since the slices can be isolated from each other, as if they are physically separated both in the control and user planes, the user experience of the network slice will be the same as if it was a separate network. A network slice can span all domains of the network including software applications (both memory and processing) running on network nodes, specific configurations of the core transport network, access network configurations as well as the end devices. The network slicing enables multiple operators to share a mobile network securely but by separating their own users from others, and different applications of a user to use different network slices that provide widely different performance characteristics.

The separation of control plane from the user plane, virtualization of network control functions into more granular sub-functions, along with the slicing of the mobile network's user plane and providing these slices to other organizational entities (service or application providers) creates a requirement of giving more control over these slices to those slice-owning entities. In prior art, the control plane is a completely closed (proprietary) network that is under the control of the equipment vendors of the mobile network operator. A new model is needed to provide the ability to open up the control plane functions and let the network operators, owners of network slices, $3^{rd}$ party application developers and other stakeholders provide new and innovative mobile services.

According to an aspect of this invention, the plurality of components of the control plane particularly the components of Radio Access Network (RAN) provide an interface towards various applications. Doing so, various types of control applications can securely attach and register to the control plane so that they can have visibility to or control over certain signalling/control messages that govern groups of users. This new type of control network is named as 'Open Control Network (OCN)' in this invention.

In a first embodiment, there are two key modifications in the base station and each of the key network control functions such as MMES in 4G, or AMF, and SMF in 5G:

(a) a new Open Control Interface (OCI) module that allows applications to directly register and subscribe to various available services of each control function. Basically, a $3^{rd}$ party application can receive control plane messages using OCI to view, record, intercept, or even intervene on behalf of (or in place of) a control plane entity, and (b) new capabilities within the control function to interact with OCI for control message handling. Such handling includes, but not limited to, receiving messages from OCI, sending messages to OCI, and suspending or resuming normal control message sequencing.

In a second embodiment, the $3^{rd}$ party application may request one or more of the following exemplary services from a control function:

Duplicate service: With this service, the $3^{rd}$ party application receives a copy of a specific control protocol procedure and/or message sequence. Example protocols would be RRC, S1 and X2. Example procedures would be Initial Context Setup and Bearer Modification. A probe application may use the Duplicate service to capture statistics about the network's or a network slice's Key Performance Indicators (KPI). The application registers with OCI with an exemplary registration message such as RegDuplicate(*) wherein the registration message has information elements in (*) such as (a) specific protocol type (e.g., RRC, S1, X2, etc.) and a specific procedure or message sequence (e.g., Initial Context Setup or Handover), (b) specific user(s) for which data is requested e.g., $UE_1$, $UE_2$, $UE_{(nssi=5)}$, users of slice xyz, (c) time interval of the measurement cycle, and (d) an identifier of the requesting application (e.g., application's authentication and authorization information). The application does not interfere with the normal control procedure or messaging sequence of the control function. Thus, one can view this service as 'read-only'.

Intercept function: With this service, the $3^{rd}$ party application receives a certain subset of a specific control protocol procedure and/or message sequence, and handles the overall control procedure, replying back to the control procedure with the next step to be executed (e.g., next message to be transmitted out) meanwhile, the control function suspending the control messaging until instructed to resume by the application via OCI. Example protocols would be RRC, S1 and X2. Example procedures would be Initial Context Setup and Bearer Modification. A slice admission control application may use the Intercept service to control the admission of certain group of users within the slice. The application registers with the OCI using an exemplary registration message such as RegIntercept(*) wherein the registration message has information elements such as (a) specific protocol type (e.g., RRC, S1, X2, etc.) and a specific procedure or message sequence (e.g., Initial Context Setup or Handover), (b) specific user(s) for which data is requested e.g., $UE_1$, $UE_2$, $UE_{(nssi=5)}$, users of slice xyz, (c) time interval of the measurement cycle, (d) an identifier of the requesting application (e.g., application's authentication and authorization information), and (e) which message within the message sequence of the specific protocol will be replied back by the application. Note that the control function must suspend control messaging until the original message is processed by the application, and resume control message sequencing with the next control message received back from the application.

Intervene function: With this service, the $3^{rd}$ party application receives a specific type control protocol procedure and/or message sequence and it can change information elements within a control message. Example protocols would be RRC, S1 and X2. Example procedures would be Initial Context Setup or Bearer Modification. A slice QoS control application may use the Intervene service to control the QoS of certain users within the slice. The application registers with the OCI using an exemplary registration message such as RegIntervene(*) wherein the registration message has information elements such as the (a) specific protocol type (e.g., RRC, S1, X2, etc.) and a specific procedure or message sequence (e.g., Initial Context Setup, Handover), (b) specific user(s) for which data is requested e.g., $UE_1$, $UE_2$, $UE_{(nssi=5)}$, all users of slice xyz, users with a specific QCI value, etc., (c) time interval of the measurement cycle, (d) an identifier of the requesting application (e.g., application's authentication and authorization information), and (e) which message within the message sequence of the specific protocol will be modified and looped-back by the application. Note that the control function must suspend the control messaging until the original message is modified by the application, and resume control message sequencing after it receives the modified version of the original message from the application.

Above are simply example services. Other types of services, registration protocols, and other similar registration syntaxes and semantics are possible and assumed to be covered by this application. Although the registration interface between OCI and applications would be a published open API, in another embodiment this interface can be proprietary.

Embodiments of the present invention are an improvement over prior art systems and methods.

SUMMARY OF THE INVENTION

In one embodiment, the present invention provides a method of receiving, by an application, one or more signaling/control messages from a mobile network, the mobile network comprising a separated control plane and user plane, the control plane comprising at least one control function, the at least one control function generating the signaling/control messages, and the application operated by either a mobile operator or a third-party service provider, the method as implemented in the control function and an Open Control Interface (OCI) sub-function associated with the control function comprising: (a) receiving, at the control function, a registration message from the application; (b) upon receipt of the registration message, registering the application with the OCI sub-function associated with the control function, wherein registration allows the application to receive the plurality of signaling/control messages, the plurality of signaling/control messages pertaining to a group of users of the mobile network; (c) receiving, at the control function, the plurality of signaling/control messages for the group of users; (d) relaying, by the control function, the plurality of signaling/control messages to the OCI sub-function; and (e) relaying, by the OCI sub-function, the plurality of signaling/control messages directly to the application.

In another embodiment, the present invention provides a method of receiving, by an application, one or more signaling/control messages from a mobile network, the mobile network comprising a separated control plane and user plane, the control plane comprising at least one control function, the at least one control function generating the signaling/control messages, and the application operated by either a mobile operator or a third-party service provider, the method as implemented in the application comprising: (a) transmitting a registration message to the control function wherein, upon receipt of the registration message, the application is registered with an Open Control Interface (OCI) sub-function associated with the control function, wherein registration allows the application to receive the plurality of signaling/control messages, the plurality of signaling/control messages pertaining to a group of users of the mobile network; (b) receiving the plurality of signaling/control messages directly from the OCI sub-function, wherein the plurality of signaling/control messages received by the OCI sub-function are forwarded to it by the control function, and wherein the control function suspends processing of control messaging; (c) processing each of the received plurality of signaling/control messages and relaying a response regarding the processing of each of the received plurality of signaling/control messages to the OCI sub-function, wherein the OCI sub-function further relays each response to the control function; and wherein upon receiving such responses, the control function resumes previously suspended processing of control messaging.

In yet another embodiment, the present invention provides a control function or the control plane of the mobile operator, having the functions of: (a) a registration interface to a plurality of external applications; (b) a first database storing information on the plurality of external applications; (c) a sub-function receiving action requests from an external application within the plurality of external applications for handling signaling messages generated by the control function; (d) a second database storing action requests of each external application for each message type; (e) a control messaging interface for communicating with a plurality of external applications; and (f) a control message processor to manage a state of each signaling message that is in a processing state of a given external application.

In another embodiment, the present invention provides an article of manufacture comprising non-transitory computer storage medium storing computer readable program code which, when executed by a processor implements a method of receiving, by an application, one or more signaling/control messages from a mobile network, the mobile network comprising a separated control plane and user plane, the control plane comprising at least one control function, the at least one control function generating the signaling/control messages, and the application operated by either a mobile operator or a third-party service provider, the method implemented in the application, the medium comprising: (a) computer readable program code transmitting a registration message to the control function wherein, upon receipt of the registration message, the application is registered with an Open Control Interface (OCI) sub-function associated with the control function, wherein registration allows the application to receive the plurality of signaling/control messages, the plurality of signaling/control messages pertaining to a group of users of the mobile network; (b) computer readable program code receiving the plurality of signaling/control messages directly from the OCI sub-function, wherein the plurality of signaling/control messages received by the OCI sub-function are forwarded to it by the control function, and wherein the control function suspends processing of control messaging; (c) computer readable program code processing each of the received plurality of signaling/control messages and relaying a response regarding the processing of each of the received plurality of signaling/control messages to the OCI sub-function, wherein the OCI sub-function further relays each response to the control function; and wherein upon receiving such responses, the control function resumes previously suspended processing of control messaging.

In another embodiment, the present invention provides an article of manufacture comprising non-transitory computer storage medium storing computer readable program code which, when executed by a processor implements a method of receiving, by an application, one or more signaling/control messages from a mobile network, the mobile network comprising a separated control plane and user plane, the control plane comprising at least one control function, the at least one control function generating the signaling/control messages, and the application operated by either a mobile operator or a third-party service provider, the method implemented in the control function and an Open Control Interface (OCI) sub-function associated with the control function, the medium comprising: (a) computer readable program code receiving, at the control function, a registration message from the application; (b) upon receipt of the registration message, computer readable program code registering the application with the OCI sub-function associated with the control function, wherein registration allows the application to receive the plurality of signaling/control messages, the plurality of signaling/control messages pertaining to a group of users of the mobile network; (c) computer readable program code receiving, at the control function, the plurality of signaling/control messages for the group of users; (d) computer readable program code relaying, by the control function, the plurality of signaling/control messages to the OCI sub-function; and (e) computer readable program code relaying, by the OCI sub-function, the plurality of signaling/control messages directly to the application.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 7 illustrates the RRC procedure according to prior art.

DESCRIPTION OF THE PREFERRED EMBODIMENTS

Figure 1:
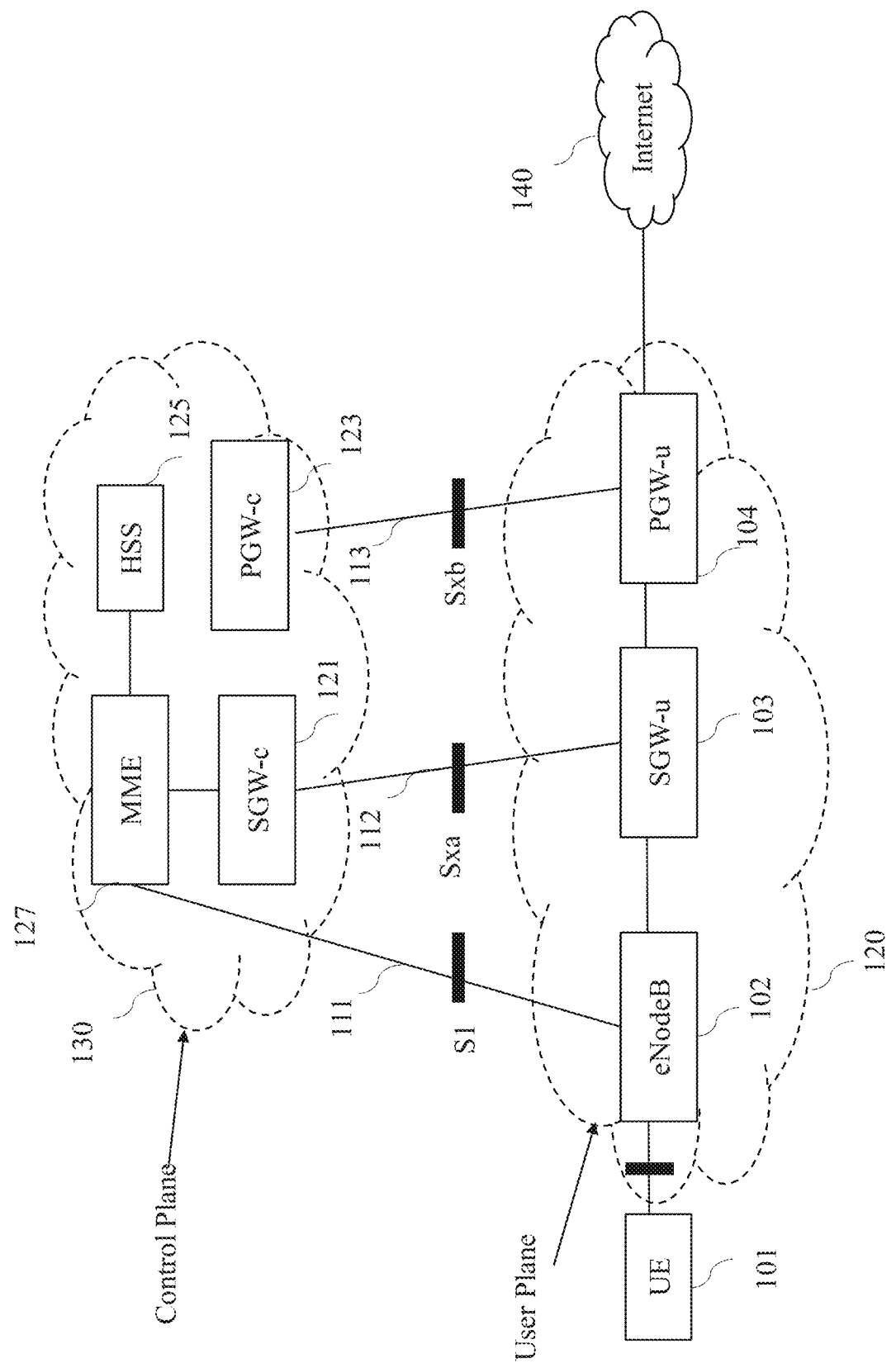
FIG. 1 illustrates an exemplary 4G user plane and control plane (prior art).

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a base station, router, switch, gateway, base station, AMF, MME, SMF, etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a base station, switch, router, controller, gateway or host is a piece of networking component, including hardware and software that communicatively interconnects with other equipment of the network (e.g., other network devices, and end systems). Switches provide network connectivity to other networking equipment such as switches, gateways, and routers that exhibit multiple layer networking functions (e.g., routing, layer-3 switching, bridging, VLAN (virtual LAN) switching, layer-2 switching, Quality of Service, and/or subscriber management), and/or provide support for traffic coming from multiple application services (e.g., data, voice, and video). User Equipment (UE) is generally a user device such as a cellular phone, or a sensor, or a computer or another type of equipment that wirelessly and with-wire connects to a network.

Any physical device in the network has a type, location, ID/name, Medium Access Control (MAC) address, and Internet Protocol (IP) address. Furthermore, a physical device can host a collection of VNFs, each identified by a virtual port number and/or virtual IP address.

Note that while the illustrated examples in the specification discuss mainly 5G networks relying on NFV (defined by European Telecommunications Standards Institute (ETSI)), embodiments of the invention may also be applicable to other kinds of networks (mobile and non-mobile) that have similar separated and closed control plane network.

3GPP's $5^{th}$ generation mobile network (5G) standards provide the software architecture, interfaces and protocols for a mobile operator to separate the control plane and user plane. Furthermore, a new service-based architecture is designed for the control plane by widely distributing various control functions as virtualized network functions (VNFs), wherein each VNF can directly consume services of other network functions. Although the control plane has been separated from the user plane and its functions are distributed in a highly granular way, yet these control plane functions are controlled solely by the equipment vendors in a closed-box manner. Visibility to the operator and $3^{rd}$ parties is not provided to receive, intercept or intervene control messages. This invention provides a system and method to enable a so-called 'open control network', wherein the control plane functions within the Radio Access Network (such as eNodeB and gNodeB) and Core Network (such as MME, AMF and SMF) provide an interface towards the operator and $3^{rd}$ party control applications.

FIG. 1 shows a simple prior art 4G/LTE network with control plane 130 and user plane 120 wherein user plane 120 is attached to Internet 140. User Equipment (UE) 101 is a mobile terminal that communicates with other mobile terminals or applications on Internet 140 using mobile operator's network. User plane 120 comprises base station (eNodeB) 102 that interfaces with UE 101 via a radio interface, and connects to Enhanced Core Network (EPC), which comprises a plurality of Serving GW(s)/SGW 103 and Packet GW(s)/PGW 104. Here, PGW 104 is attached directly to Internet 140. The control network comprises (a) SGW control function, SGW-C 121, which attaches to a plurality of SGW(s) 103 via interface 112 (known as Sxa interface), (b) PGW control function, PGW-C 123, which attaches to a plurality of PGW(s) 104 via interface 113 (known as Sxb interface), (c) Mobility Management Entity (MME) 127, and Home Subscriber Server (HSS) 125. MME 127 attaches to eNodeB 102 via control interface 111 (known as S1 control plane (S1-CP)). MME 127 performs (a) bearer activation/deactivation, (b) selection of appropriate SGW and PGW for the UE to connect to the Internet, (c) the role of termination point for Non-Access Stratum (NAS) signaling of each UE, and (d) communications with HSS 125 for user identification, authentication and location services.

Figure 2:
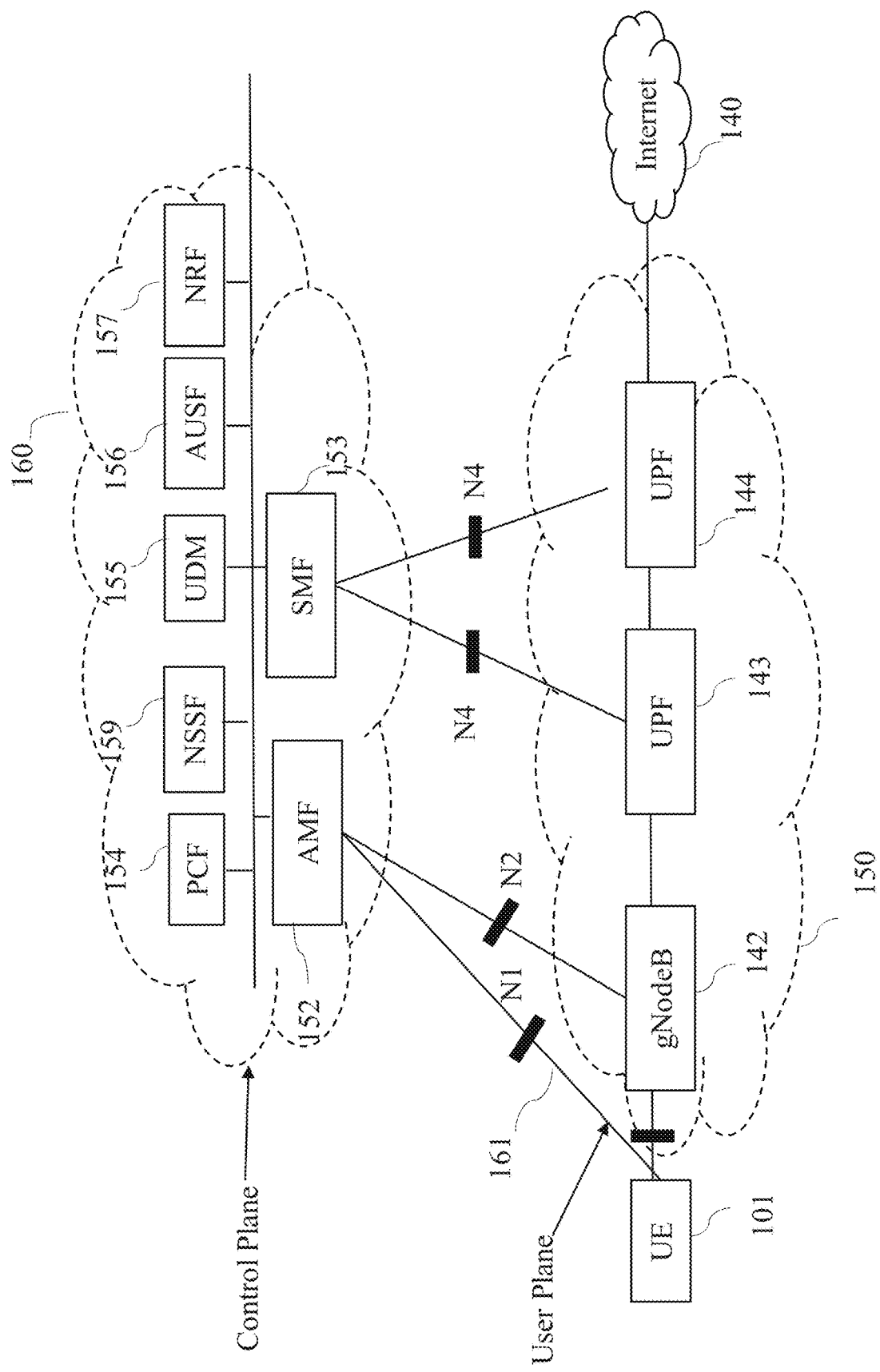
FIG. 2 illustrates an exemplary 5G user plane and control plane (prior art).

FIG. 2 illustrates a simple prior art 5G network with control plane 160 and user plane 150, wherein user plane 150 is attached to Internet 140. The control and user planes are modeled in 5G using a service oriented architecture (SOA), which is a type of software design where services of each component are provided to the services of all other components through a communication protocol over a network. A service is defined as a discrete functionality that can be accessed remotely and acted upon and updated independently. Each control plane function is modeled as a granular service component and replicated in the network. The SGW and PGW functions of the user plane of 4G are merged as a User Plane Function (UPF) in 5G.

User equipment (UE) 101 is a mobile terminal that communicates with other mobile terminals or applications on Internet 140 using mobile operator's network. User plane 150 comprises base station (gNodeB) 142 that interfaces with UE 101 via a radio interface, and connects to Packet Core (PC) Network, which comprises a plurality of User Plane Functions (UPFs) shown as UPF 143 and UPF 144 (that is attached directly to Internet 140). Control network 160 comprises various control functions granularly decomposed such as AMF (access mobility management function) 152, SMF (session management function) 153, PCF (policy control function) 154, UDM (user data management) 155, NRF (network repository function) 157 and AUSF (authentication server function) 156, NSSF (network slice selection function) 159, etc. AMF 152 and SMF 153 jointly provide all the functionalities of MME 127. AMF 152 attaches to UE 101 via control interface 161 (N1 interface). It also attaches to a plurality of gNodeB(s) via N2 interface. SMF 153 interfaces to a plurality of UPFs using N4 interface. The role or each control plane function and the control interface messages are clearly defined in 5G specifications and for that reason will not be recited here.

Figure 3:
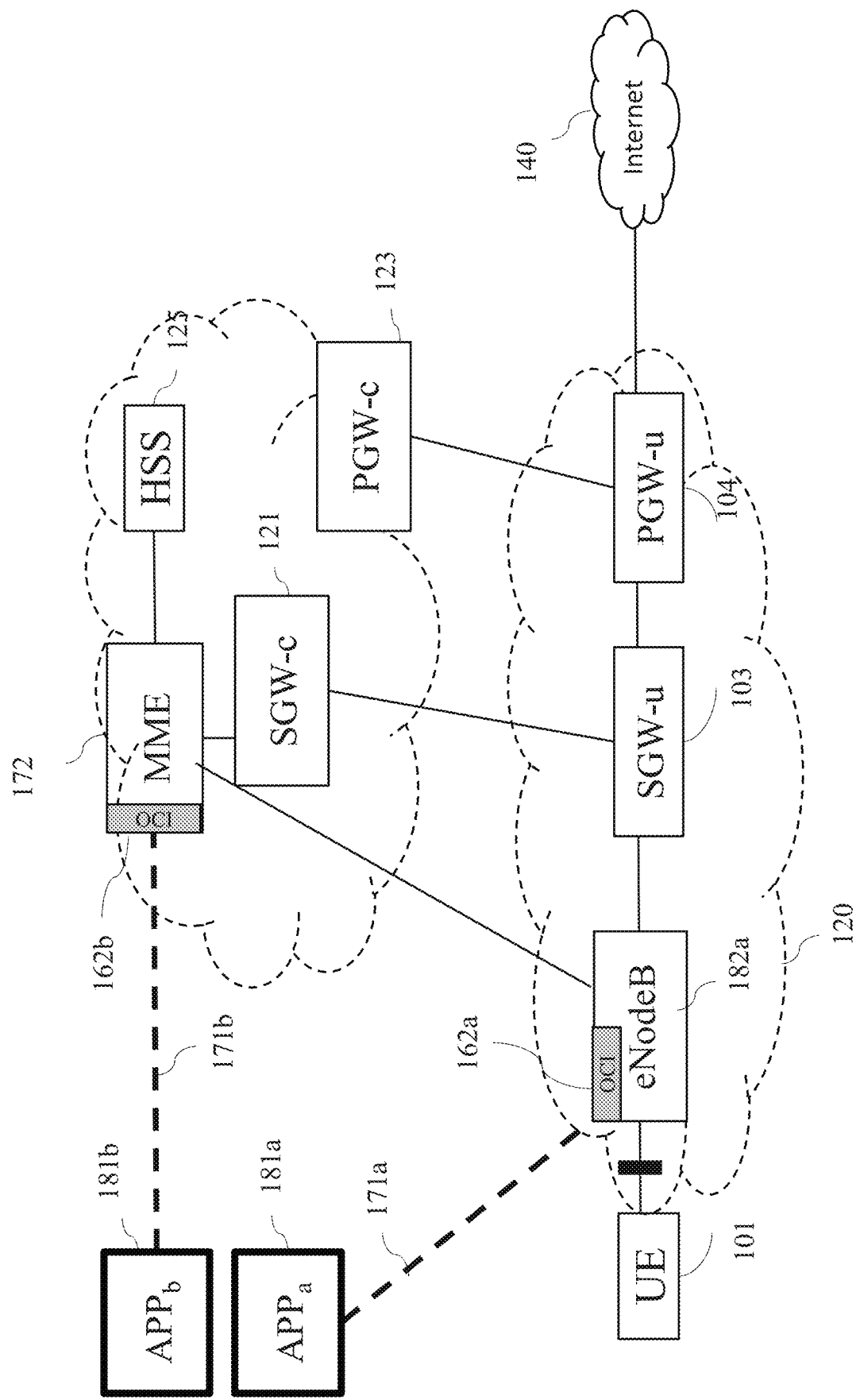
FIG. 3 illustrates an exemplary Open Control Network for 4G according to the present invention.

FIG. 3 illustrates an embodiment of this invention for a simple 4G network that is illustrated in FIG. 1. According to this invention, control plane functions within eNodeB 182a is opened up to operator or $3^{rd}$ Party control application denoted as $APP_a$ 181a, and similarly control plane functions within MME 172 are opened up to a separate application, $APP_b$ 181b. Here, eNodeB 182a has an Open Control Interface (OCI) module 162a to allow $APP_a$ to register to services of eNodeB 182a and to receive control messages through interface 171a. Similarly, MME 172 has an Open Control Interface (OCI) module 162b to allow $APP_b$ to register to certain control services of MME 172 and to receive control messages through interface 171b. Furthermore, eNodeB 182a and MME 172 have been modified, according to aspects of this invention, to provide the required capabilities to interact with their collocated OCI for proper messaging process handling to enable synchronized operations with Open Control Network. In an exemplary embodiment, interfaces 171a and 171b use an IP protocol such as HTTP. The payload carries (a) registration messages or (b) control messages.

Figure 4:
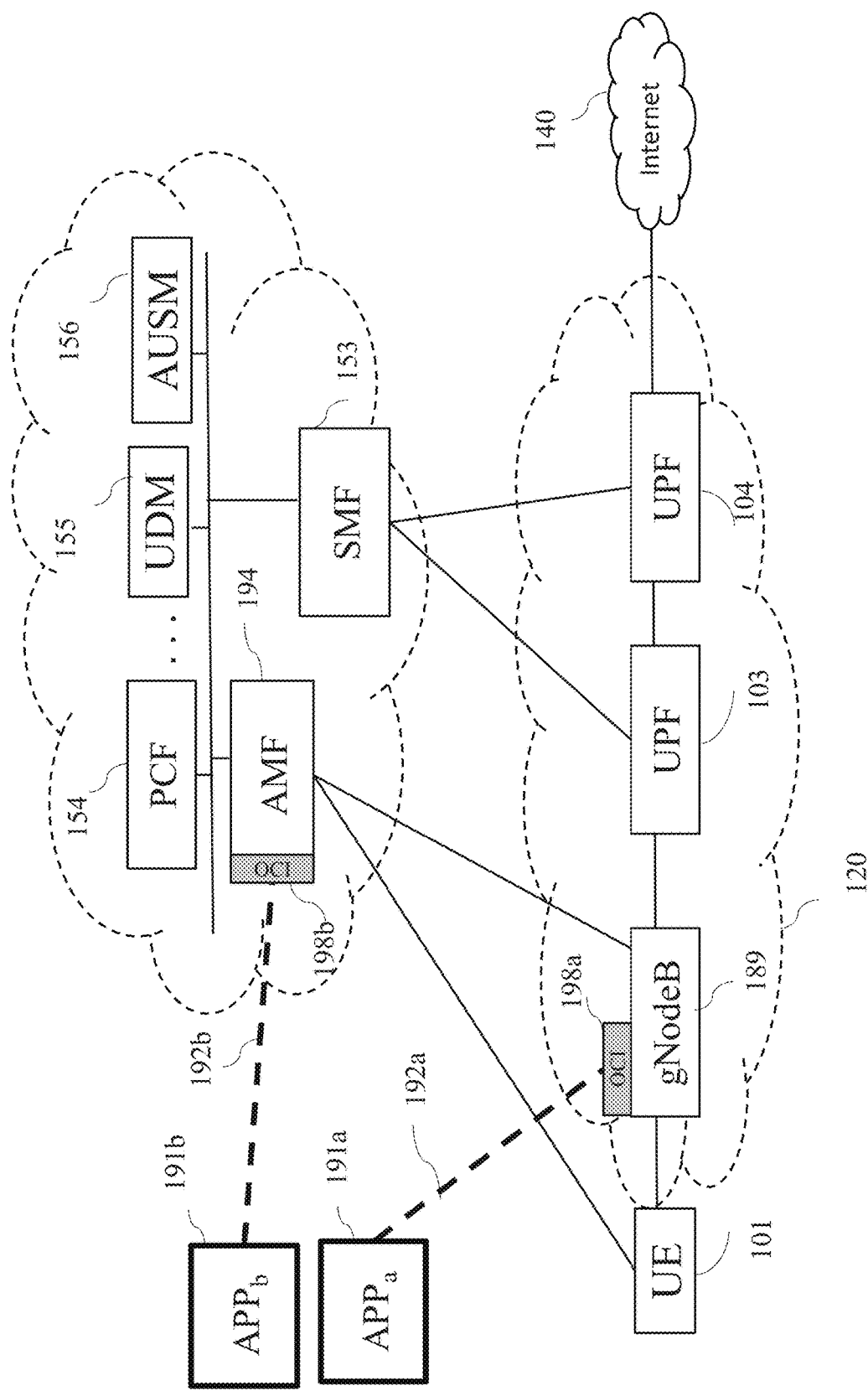
FIG. 4 illustrates an exemplary Open Control Network for 5G according to the present invention.

FIG. 4 illustrates yet another embodiment of this invention for a simple 5G network that is illustrated in FIG. 2. According to this invention, control plane functions within gNodeB 189 is opened up to $3^{rd}$ Party control application $APP_a$ 191a, and control plane functions within AMF 194 is opened up to another application, $APP_b$ 191b. Here, gNodeB 189 has an Open Control Interface (OCI) module 198a to allow $APP_a$ to register to selected control services of eNodeB 189 and to receive control messages through interface 192a. Similarly, AMF 194 has an Open Control Interface (OCI) module 198b to allow $APP_b$ to register to selected control services of AMF 194 and to receive control messages through interface 192b. Furthermore, gNodeB 189 and AMF 194 have been modified, according to aspects of this invention, to provide the required capabilities to interact with their collocated OCI for proper message process handling to enable the Open Control Network. In an exemplary embodiment, interfaces 192a and 192b use an IP protocol such as HTTP. The payload carries (a) registration messages or (b) control messages.

Within the context of this invention, the terms such as control message and signaling message are used interchangeably. Similarly, control application, signaling application, control service, signaling service or application are terms that are used interchangeably for an operator or $3^{rd}$ Party application that consumes services of an open control network according to aspects of this invention.

Figure 5:
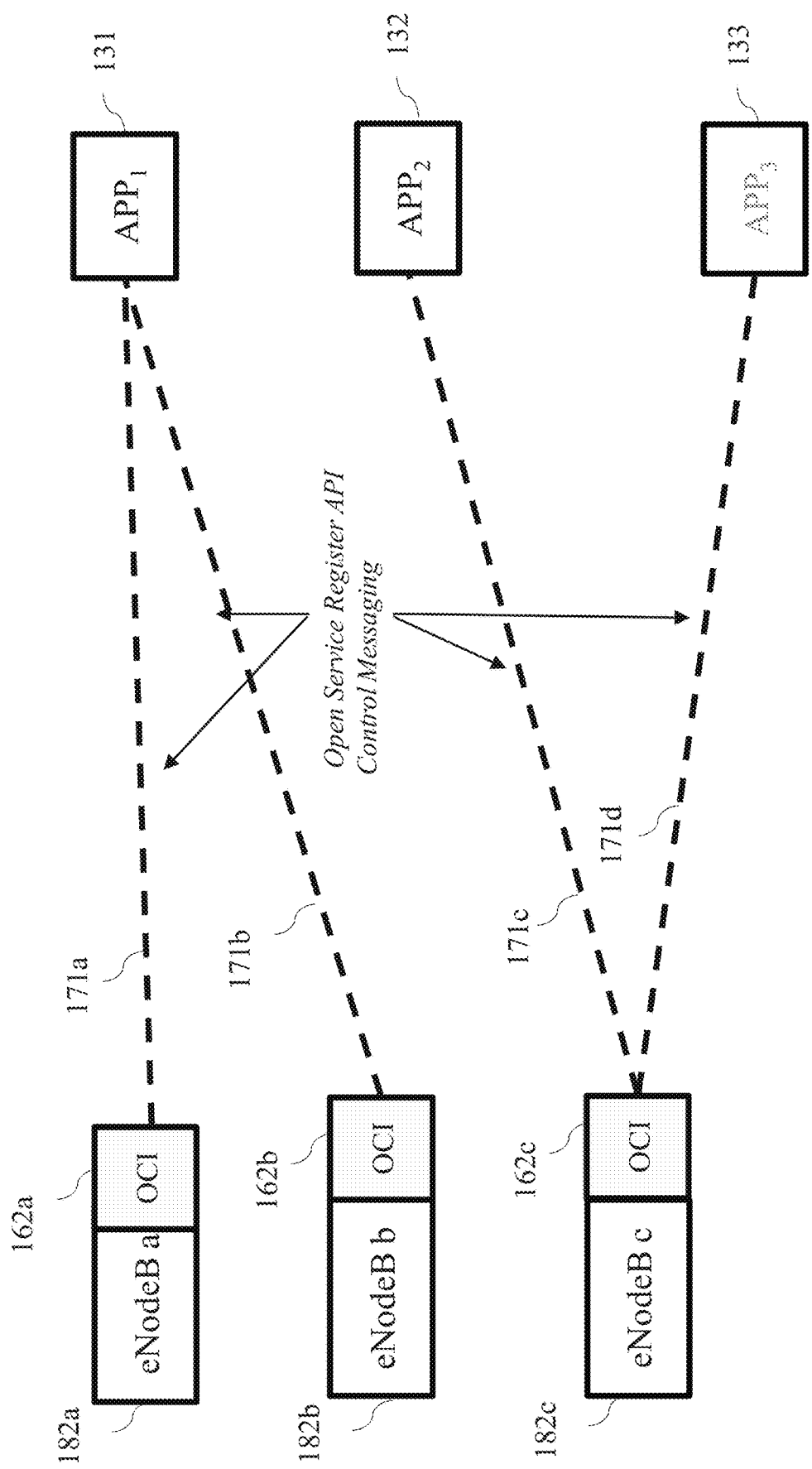
FIG. 5 illustrates attachment of $3^{rd}$ party applications to Open Control Network.

FIG. 5 illustrates yet another embodiment of this invention wherein $APP_1$ 131 registers to control services of both $eNodeB_a$ 182a and $eNodeB_b$ 182b, and receives control messages using separate interfaces 171a and 171b, through OCI 162a and 162b, respectively. $APP_1$ 131 may register to the same service or different services of these two base stations. In this scenario, $APP_2$ 132 and APPS 133 both register to services of eNodeBc 182c and receive control messages from OCI 162c. Again, these two applications may register to the same or different services of the same base station.

The operator may have a published Open Service Registry API (OSR-API) to allow an authenticated application to securely connect to a specific control network function. However, OCI may have proprietary APIs towards the application. This interface is for (a) to register the requested $3^{rd}$ Party control applications, and (c) to send/receive control messages.

Figure 6:
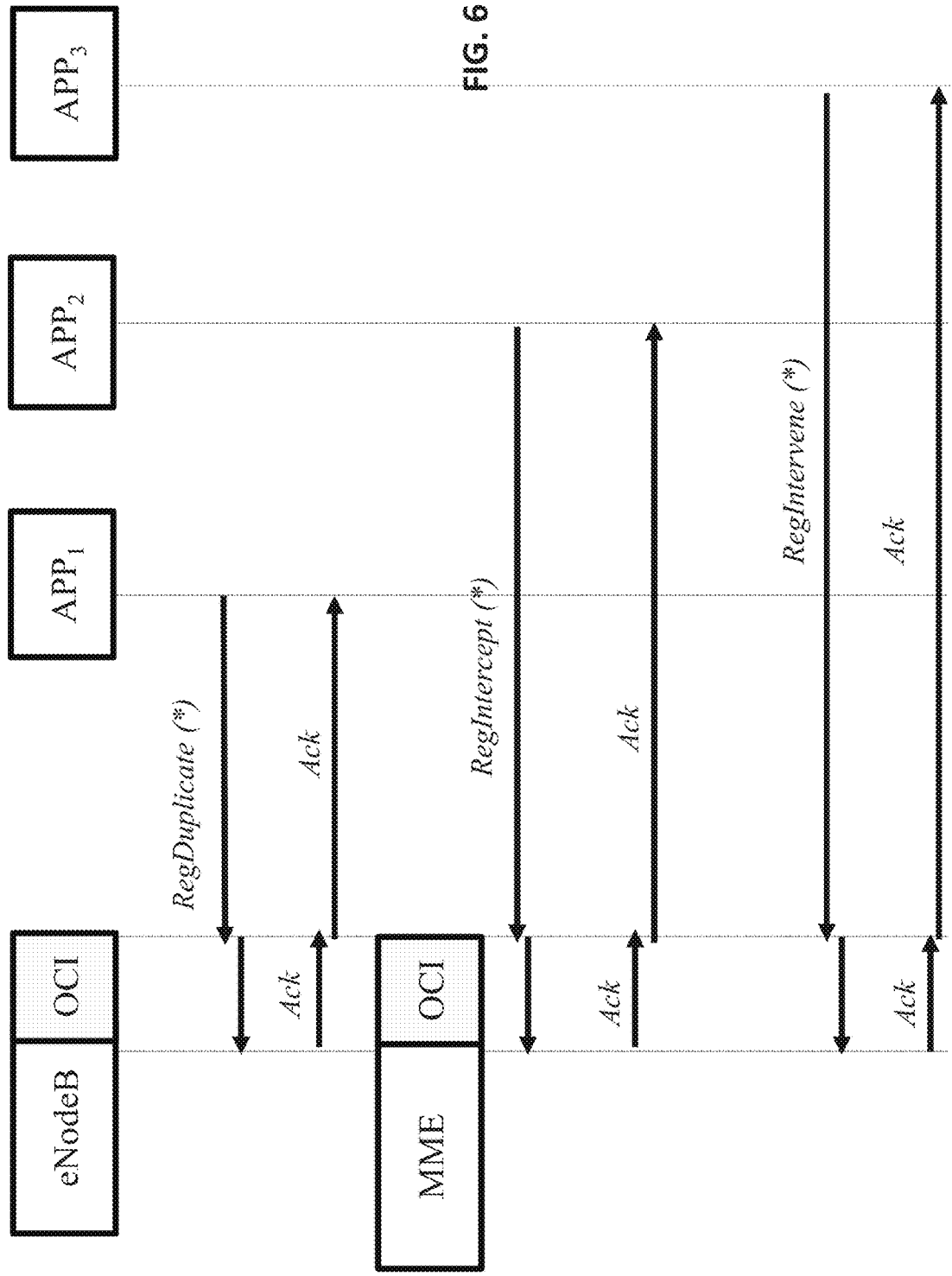
FIG. 6 illustrates an exemplary collection of registration scenario.

FIG. 6 illustrates a key embodiment of this invention wherein three exemplary control services are depicted for the registry of operator or $3^{rd}$ Party control applications. Here, $APP_1$ 131 registers to a service that duplicates all RRC messages between a specified group of UEs and an eNodeB. This control service is registered by using RegDuplicate (*) API. The registration message may include several information elements such as the list of explicitly specified UEs, or a group of UEs that has the same attribute such as a network slice identifiable within the control message packet header such as NSSI (network slice subnet instance), the start and stop time of the requested service, etc. Similarly $APP_2$ registers with MME's service of intercepting control messages using RegIntercept (*), and APPS registers with MME's service of intervening control messages using RegIntervene (*), wherein there may be several information elements that are not shown in the diagram within each registry message.

In all three registration scenarios depicted in FIG. 6, subsequent to successful registration, the OCI must send a so called 'action registration' to its collocated (or integrated) control function to indicate what control messages and how it wants to receive/send. These actions specify, for example, which messages (and under which trigger conditions) must be forwarded, received, discarded, suspended or resumed.

When specific actions are successfully configured by the control function and an ACK is sent to the OCI, the OCI in turn sends an ACK to the application. There may be other types of control services that are not covered here, but this invention includes all other services that require an open control network function.

One of the most essential control/signaling protocol between a UE and base station is RRC, which is well known in prior art, and illustrated in FIG. 7. This protocol has the steps of establishing a new connection between a UE and base station. The figure illustrates the successful and unsuccessful connection setup scenarios. The UE starts with RRCSetup Request, upon receiving this message, base station sends RRCSetup, and the procedure is completed by UE sending an RRCSetupComplete. In prior art, RRC messages are always between the UE and base station, and on the radio interface, and therefore never sent to other interfaces. This invention allows the base station to be instructed to send such messages that are invisible to outside world to an application that wants to see a duplicate or to process it.

Figure 8:
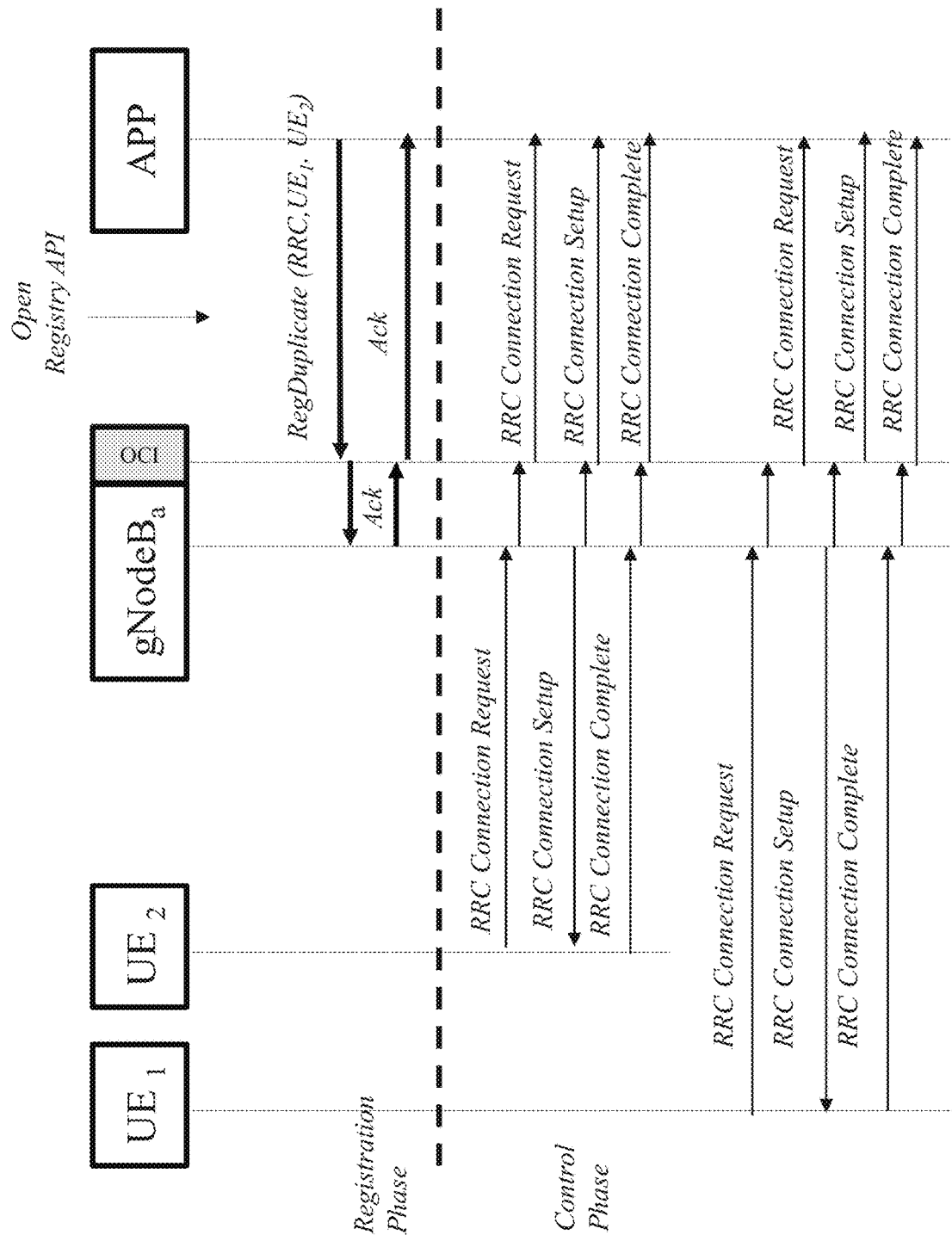
FIG. 8 illustrates the registration for 'duplicate service' and control messaging with OCL.

In FIG. 8 a simple probe application registers with the OCI of eNodeB$_a$ the 'duplicate RRC service' for RRC Connection Setup procedure which aims at receiving copies of all RRC Connection Setup procedure related messages (RRC Connection Request, RRC Connection Setup, RRC Connection Complete, and RRC Connection Reject) between UE$_1$ and eNodeB$_a$, and UE$_2$ and eNodeB$_a$. The application sends the RegDuplicate(*) message directly to OCI. Then, OCI sends the required actions to eNodeB$_a$ and when eNodeB$_a$ returns an ACK, the OCI sends an ACK to the application. The ACK signifies the successful completion of the registration phase. After this phase, OCI starts forwarding the RRC messages that it receives from the eNodeB.

Figure 9:
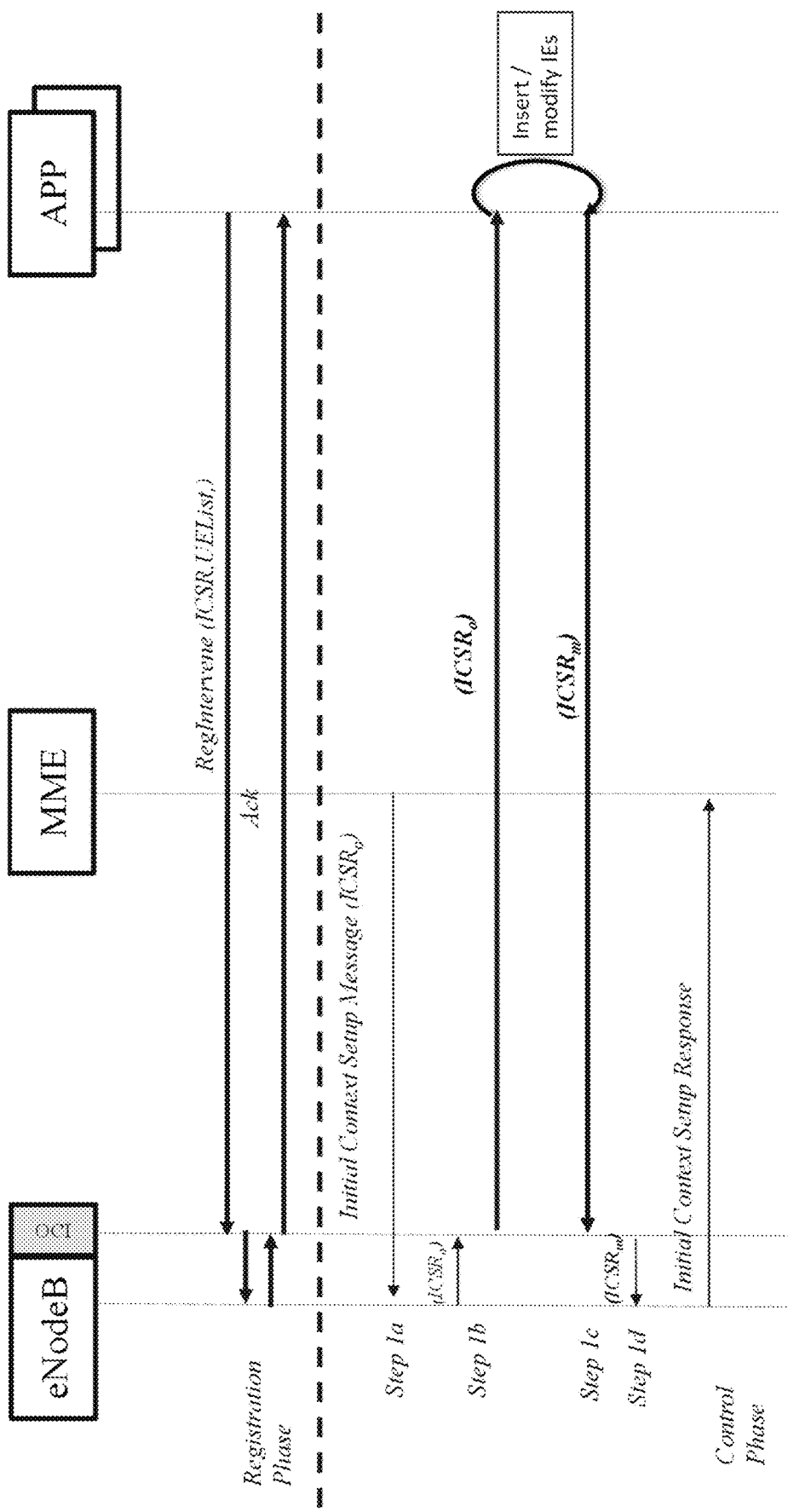
FIG. 9 illustrates the registration for 'intervene service' and control messaging with OCL.

FIG. 9 shows a flow diagram of another type of 3$^{rd}$ Party application, which is a slice QoS control application attached to Open Control Plane. This application first registers to 'Intervene S1 interface service', which basically aims at receiving a copy of Initial Context Setup Request (ICSR) that is sent by MME to eNodeB on a specific S1 interface. The aforementioned application first attaches to OCI of eNodeB. First, the application sends the RegIntervene(*) message to OCI. The registration contains information elements on which ICSRs are of interest. Once the OCI return an ACK to that application signifying a successful completion of the registration phase. Note that prior to this step, the OCI must send the required action to eNodeB. After this phase, the eNodeB, receiving the first Initial Context Setup Request, labeled as original ICSR (ICSR$_o$) from the MME matching the profile in Step 1a, it forwards that ICSR$_o$ to it's OCI in Step 1b, which in turn sends it to the application. It is important to note that (a) either the OCI keeps the ICSR$_o$ in its database until the modified version arrives, or (b) both eNodeB and OCI simply discard the ICSR$_o$ since they are waiting for the application to intervene the message and send a (new) modified ICSR$_m$ in place of ICSR$_o$. If the method of (a) is chosen, then OCI may need to keep the original messages in a pending state in a repository until the corresponding modified message has been received. The application may decide to change one or more IEs of ICSR$_o$ such as the QoS setting stored within the QCI IE of the ICSR message to reflect a specific slice related change. The application returns the modified ICSR, ICSR$_m$ back to the OCI in Step 1c, which then sends it to the eNodeB in Step 1d. The OCI then discards the previously received ICSR (if it is stored in a pending state in the state machine of its Control Message Processor), replaces it with the updated ICSR and transfers that message back to eNodeB for normal processing. As a result, the eNodeB generates the Initial Context Setup Response towards the MME to complete the procedure. Note that the eNodeB is instructed by OCI to perform the following actions in sequence for the ICSR messages pertaining to say UE$_1$:

1. Send ICSR$_o$ of UE$_1$ to OCI, then discard (or store) message,
2. Wait to receive ICSR$_m$ from OCI corresponding to ICSR$_o$ of UE$_1$,
3. Suspend normal messaging until receiving ICSR$_m$,
4. Resume normal messaging after receiving ICSR$_m$ by generating the response message to UE$_1$.

Above state changes are dictated to the control function by OCI during the registration phase. A similar procedure can be defined on N2 interface between AMF and gNodeB and along other control interfaces.

Figure 10:
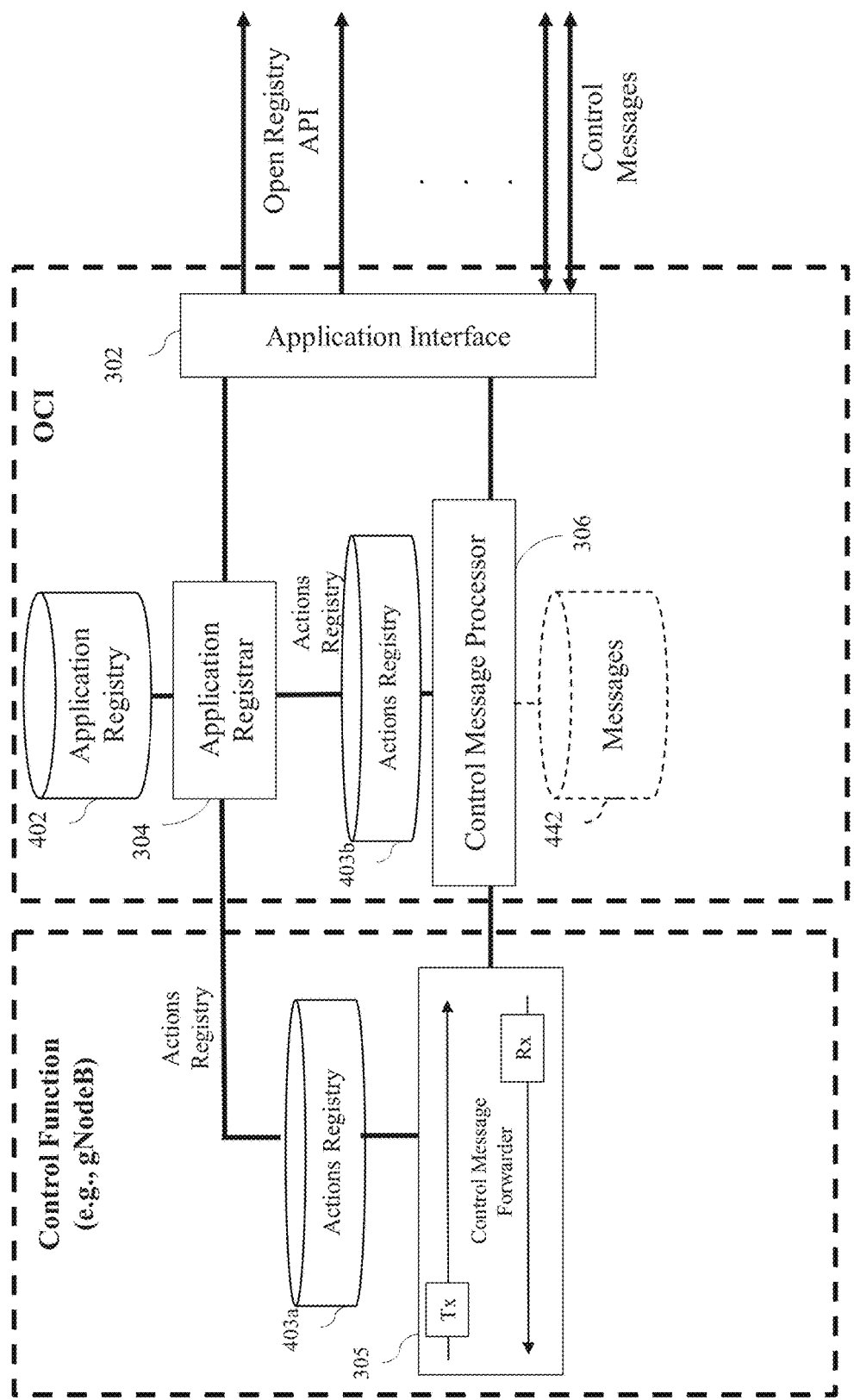
FIG. 10 illustrates a simple system diagram showing new modules of a control function and associated OCI according to the present invention.

FIG. 10 shows a simple block diagram of OCI and its associated control function showing its key components to enable Open Control Network. The OCI can be designed generically and can be part of any control function of the 4G/5G control plane. OCI has application interface 302, which enables a plurality of different applications to securely connect and register to available open control services. Those applications that register with OCI are stored in Application Registry 402. Application Registrar 304 authenticates and authorizes applications, and then registers the application-specific information into Application Registry 402. Each application's requested control messaging actions are sent by OCI and stored into Actions Registry 403a within the control function, which controls Control Message Forwarder 305, which handles the sequencing of control messages from/to the control function to its OCI and to the other end of the control function. The Actions Registry 403a may include the following possible actions for a specific type of messaging protocol:

message forwarding to OCI
message receiving from OCI
message discarding, after message forwarding
message discarding, after message receiving
suspending messaging until a specific trigger
resuming messaging at a specific trigger
etc.

The reciprocal or subsequent actions may also be stored in Actions Registry 403b within the OCI. Any message forwarding action that requires a special handling is sent to Control Message Processor 306 within OCI, which may, for example, hold messages in its Messages Database 442 in a 'pending state' until an action-update is received, or simply operate a timer for request/response type control message handling. It may also swift through and route control messages according to applications requesting them.

In one embodiment, the present invention provides an article of manufacture comprising non-transitory computer storage medium storing computer readable program code which, when executed by a processor implements a method of receiving, by an application, one or more signaling/control messages from a mobile network, the mobile network comprising a separated control plane and user plane, the control plane comprising at least one control function, the at least one control function generating the signaling/control messages, and the application operated by either a mobile operator or a third-party service provider, the method implemented in the application, the medium comprising: (a) computer readable program code transmitting a registration message to the control function wherein, upon receipt of the registration message, the application is registered with an Open Control Interface (OCI) sub-function associated with the control function, wherein registration allows the application to receive the plurality of signaling/control messages, the plurality of signaling/control messages pertaining to a group of users of the mobile network; (b) computer readable program code receiving the plurality of signaling/control messages directly from the OCI sub-function, wherein the plurality of signaling/control messages received by the OCI sub-function are forwarded to it by the control function, and wherein the control function suspends processing of control messaging; (c) computer readable program code processing each of the received plurality of signaling/control messages and relaying a response regarding the processing of each of the received plurality of signaling/control messages to the OCI sub-function, wherein the OCI sub-function further relays each response to the control function; and wherein upon receiving such responses, the control function resumes previously suspended processing of control messaging.

In another embodiment, the present invention provides an article of manufacture comprising non-transitory computer storage medium storing computer readable program code which, when executed by a processor implements a method of receiving, by an application, one or more signaling/control messages from a mobile network, the mobile network comprising a separated control plane and user plane, the control plane comprising at least one control function, the at least one control function generating the signaling/control messages, and the application operated by either a mobile operator or a third-party service provider, the method implemented in the control function and an Open Control Interface (OCI) sub-function associated with the control function, the medium comprising: (a) computer readable program code receiving, at the control function, a registration message from the application; (b) upon receipt of the registration message, computer readable program code registering the application with the OCI sub-function associated with the control function, wherein registration allows the application to receive the plurality of signaling/control messages, the plurality of signaling/control messages pertaining to a group of users of the mobile network; (c) computer readable program code receiving, at the control function, the plurality of signaling/control messages for the group of users; (d) computer readable program code relaying, by the control function, the plurality of signaling/control messages to the OCI sub-function; and (e) computer readable program code relaying, by the OCI sub-function, the plurality of signaling/control messages directly to the application.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of an apparatus and method for an open control plane in wireless networks. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A method comprising:
   receiving, at a base station of a mobile network, a registration message from an application operated by a mobile operator or a third-party service provider, wherein the registration message includes data indicating a control protocol procedure; and
   by the base station, in response to receiving the registration message, registering the application with the base station, wherein the registering causes the base station to send one or more signaling/control messages to the application by:
   obtaining, by the base station, the one or more signaling/control messages; and
   sending, by the base station via an interface, in response to determining the one or more signaling/control messages are for the control protocol procedure indicated by the data in the registration message, the one or more signaling/control messages to the application.

2. The method of claim 1, wherein the base station comprises an eNodeB or a gNodeB, the eNodeB or the gNodeB representing a control function for a control plane of the mobile network.

3. The method of claim 1, further comprising:
   processing, by the base station, the one or more signaling/control messages without additional input from the application.

4. The method of claim 1,
   wherein the one or more signaling/control messages comprise one or more first signaling/control messages, and
   wherein the registration message includes data indicating one or more second signaling/control messages that the base station is to receive from the application in response to the one or more first signaling/control messages sent to the application.

5. The method of claim 1, wherein the one or more signaling/control messages pertain to a group of users of the mobile network.

6. The method of claim 1, wherein the one or more signaling/control messages conform to a Radio Resource Control (RRC) protocol.

7. The method of claim 1, wherein the application manages a network slice configured in the mobile network.

8. The method of claim 1, wherein the registration message indicates a request from the application to receive a duplicate service from the base station.

9. A method comprising:
   receiving, at a base station of a mobile network, a registration message from an application operated by a mobile operator or a third-party service provider, wherein the registration message includes data indicating a type of protocol; and
   by the base station, in response to receiving the registration message, registering the application with the base station, wherein the registering causes the base station to send one or more signaling/control messages to the application by:
   obtaining, by the base station, the one or more signaling/control messages; and
   sending, by the base station via an interface, in response to determining the one or more signaling/control messages are of the type of protocol indicated by the data in the registration message, the one or more signaling/control messages to the application.

10. The method of claim 9, wherein the one or more signaling/control messages conform to a Radio Resource Control (RRC) protocol.

11. A method comprising:
    receiving, at a base station of a mobile network, a registration message from an application operated by a mobile operator or a third-party service provider, wherein the registration message includes data indicating a message sequence of one or more first signaling/control messages; and
    by the base station, in response to receiving the registration message, registering the application with the base station, wherein the registering causes the base station to send one or more second signaling/control messages to the application by:
    obtaining, by the base station, the one or more second signaling/control messages; and
    sending, by the base station via an interface, in response to determining the one or more second signaling/control messages are included in the message sequence of one or more first signaling/control messages indicated by the data in the registration message, the one or more second signaling/control messages to the application.

12. The method of claim 11, wherein the second one or more signaling/control messages conform to a Radio Resource Control (RRC) protocol.

13. A method comprising:
    receiving, at a base station of a mobile network, a registration message from an application operated by a mobile operator or a third-party service provider; and
    by the base station, in response to receiving the registration message, registering the application with the base station, wherein the registering causes the base station to send one or more signaling/control messages to the application by:

obtaining, by the base station, the one or more signaling/control messages; and suspending, by the base station in response to obtaining the one or more signaling/control messages, a control protocol procedure;

sending, by the base station via an interface, in response to determining the application is registered to receive the one or more signaling/control messages, the one or more signaling/control messages to the application;

receiving, by the base station, a signaling/control message generated by the application and responsive to the one or more signaling/control messages;

resuming, by the base station, in response to the signaling/control message, the control protocol procedure; and processing, by the base station, data included in the signaling/control message using the control protocol procedure.

14. The method of claim 13, further comprising:

setting a timer of the base station in response to suspending the control protocol procedure; and resuming, by the base station, in response to expiry of the timer or the signaling/control message, the control protocol procedure.

15. The method of claim 13, wherein the one or more signaling/control messages conform to a Radio Resource Control (RRC) protocol.

16. A method comprising:

receiving, at a base station of a mobile network, a registration message from an application operated by a mobile operator or a third-party service provider; and by the base station, in response to receiving the registration message, registering the application with the base station, wherein the registering causes the base station to send one or more signaling/control messages to the application by:

obtaining, by the base station, the one or more signaling/control messages; and sending, by the base station via an interface, in response to determining the application is registered to receive the one or more signaling/control messages, the one or more signaling/control messages to the application;

receiving, by the base station, a signaling/control message generated by the application and responsive to the one or more signaling/control messages; and sending, by the base station, the signaling/control message to a control function for a control plane of the mobile network or to a User Equipment.

17. The method of claim 16, wherein the signaling/control message is generated by the application modifying the one or more signaling/control messages.

18. A method comprising:

receiving, at a base station of a mobile network, a registration message from an application operated by a mobile operator or a third-party service provider; and by the base station, in response to receiving the registration message, registering the application with the base station, wherein the registering causes the base station to send one or more signaling/control messages to the application by:

obtaining, by the base station, the one or more signaling/control messages;

detecting, by the base station, a trigger condition has occurred;

sending, by the base station via an interface, in response to determining the application is registered to receive the one or more signaling/control messages and detecting the trigger condition has occurred, the one or more signaling/control messages to the application.

19. The method of claim 18, wherein the registration message includes data indicating the trigger condition.

20. A base station of a mobile network, comprising:

processing circuitry coupled to memory, the processing circuitry and the memory configured to:

receive a registration message from an application operated by a mobile operator or a third-party service provider, wherein the registration message includes data indicating a control protocol procedure;

responsive to the registration message, register the application with the base station, wherein the registration causes the base station to send one or more signaling/control messages to the application;

obtain the one or more signaling/control messages; and send via an interface, in response to determining the one or more signaling/control messages are for the control protocol procedure indicated by the data in the registration message, the one or more signaling/control messages to the application.

* * * * *